US011000178B2

(12) United States Patent
Cho et al.

(10) Patent No.: US 11,000,178 B2
(45) Date of Patent: May 11, 2021

(54) TUB FOR DISHWASHER, DISHWASHER, AND METHOD OF CONTROLLING SAME

(71) Applicant: Samsung Electronics Co., Ltd., Suwon-si (KR)

(72) Inventors: Sung Min Cho, Seoul (KR); Jae Sung Kwon, Seoul (KR); Sung Min Yoo, Suwon-si (KR); In Chul Yun, Yongin-si (KR); Ki Sup Lee, Seongnam-si (KR); Jung Yoon Hahm, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 15/777,071

(22) PCT Filed: Dec. 1, 2016

(86) PCT No.: PCT/KR2016/014050
§ 371 (c)(1),
(2) Date: May 17, 2018

(87) PCT Pub. No.: WO2017/095163
PCT Pub. Date: Jun. 8, 2017

(65) Prior Publication Data
US 2018/0325349 A1 Nov. 15, 2018

(30) Foreign Application Priority Data

Dec. 3, 2015 (KR) .................. 10-2015-0171325
Sep. 9, 2016 (KR) .................. 10-2016-0116263

(51) Int. Cl.
*A47L 15/42* (2006.01)

(52) U.S. Cl.
CPC ....... *A47L 15/4291* (2013.01); *A47L 15/4246* (2013.01)

(58) Field of Classification Search
CPC .. A47L 15/4291; A47L 15/4246; Y02B 40/00
See application file for complete search history.

(56) References Cited

U.S. PATENT DOCUMENTS

2006/0130878 A1* 6/2006 Lee .................... A47L 15/4225
134/18
2012/0145200 A1 6/2012 Jerg et al.
2014/0338708 A1* 11/2014 Boyd ................. A47L 15/4274
134/113

FOREIGN PATENT DOCUMENTS

CN 102105097 A 6/2011
CN 102113873 A 7/2011
(Continued)

OTHER PUBLICATIONS

ISA/KR, "International Search Report and Written Opinion of the International Searching Authority," International Application No. PCT/KR2016/014050, dated Mar. 20, 2017, 10 pages.
(Continued)

*Primary Examiner* — Benjamin L Osterhout

(57) ABSTRACT

A dishwasher according to the present invention includes a tub having a double wall structure so that consumption of energy is reduced using water or air stored in an inner space of the double wall structure of the tub in a washing process and consumption of water is reduced using the water stored in the inner space of the double wall structure in a next washing process.

15 Claims, 24 Drawing Sheets

(56) References Cited

FOREIGN PATENT DOCUMENTS

| CN | 203749363 U | 8/2014 |
| JP | H05154083 A | 6/1993 |
| JP | H10127553 A | 5/1998 |
| JP | 2007215885 A | 8/2007 |
| KR | 101397000 B1 | 5/2014 |

OTHER PUBLICATIONS

The First Office Action in connection with Chinese Application No. 201680070813.5 dated Jul. 27, 2020, 17 pages.

* cited by examiner

[Fig. 1]
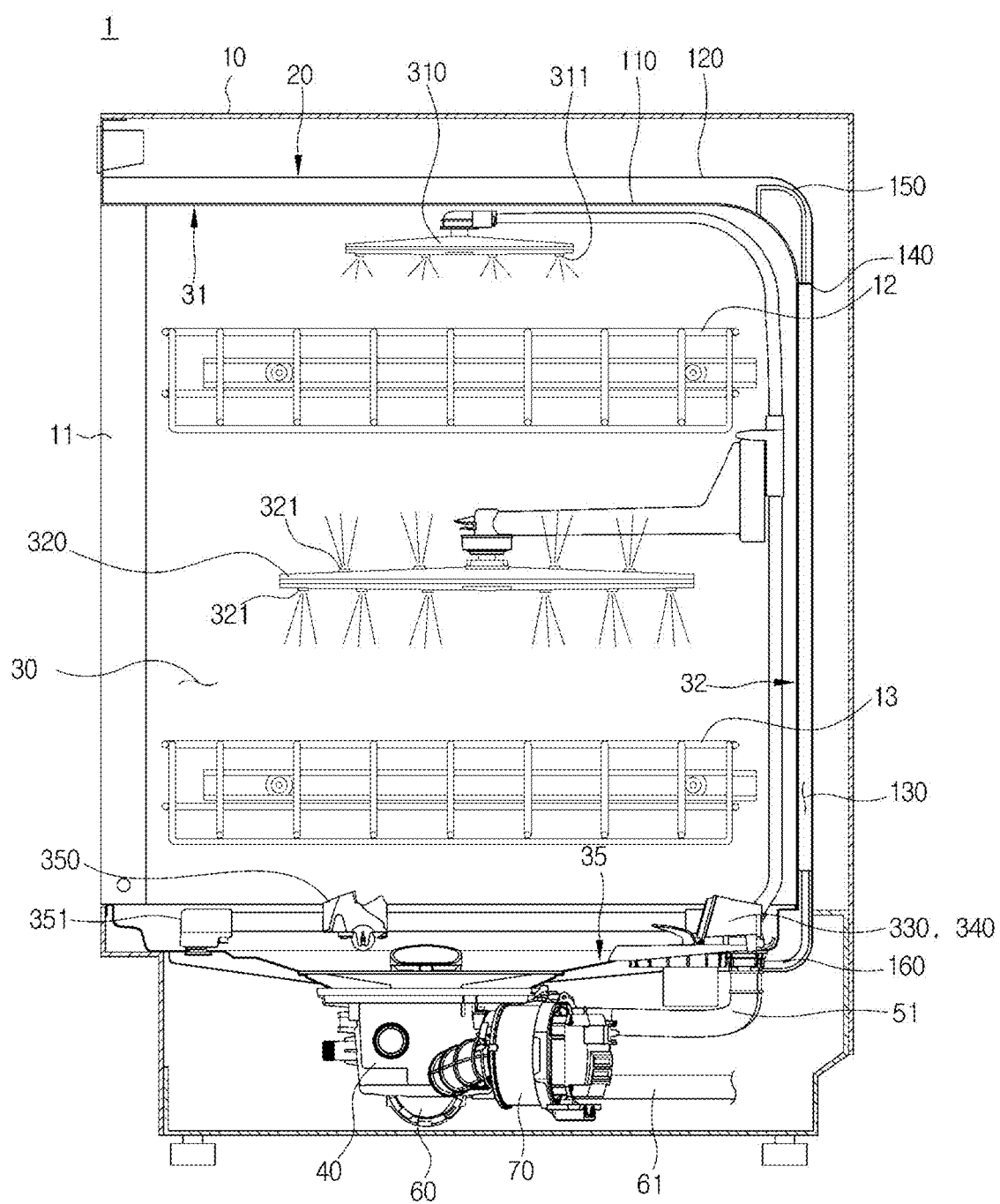

[Fig. 2]
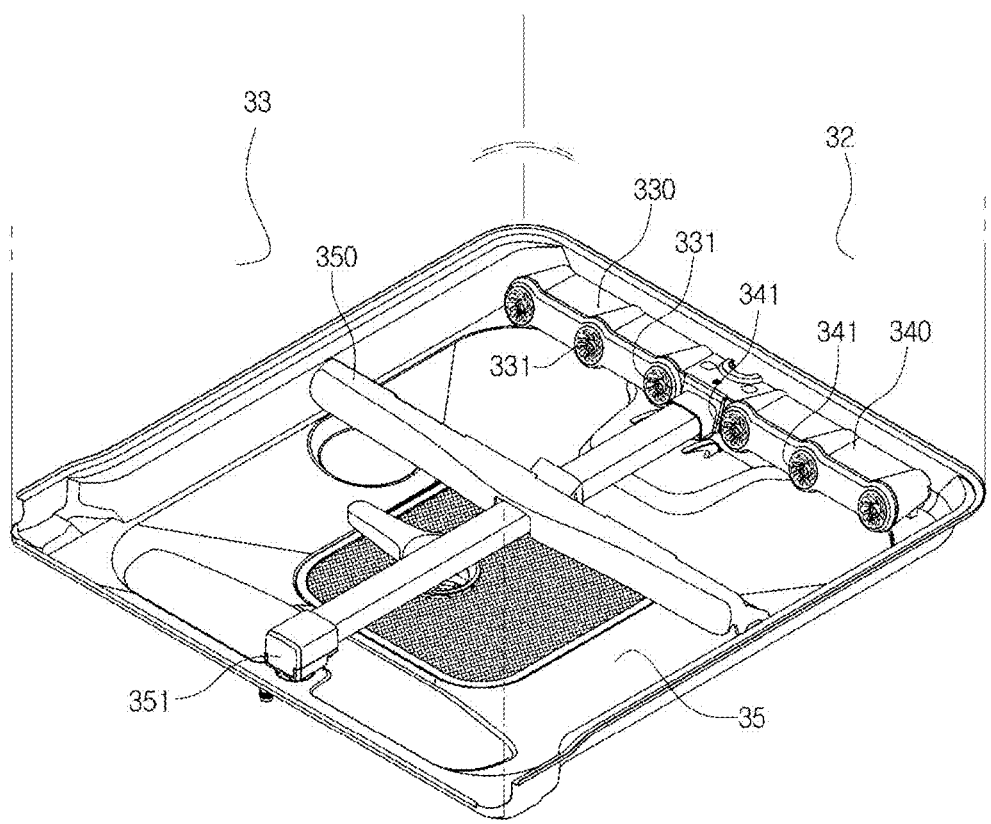

[Fig. 3]
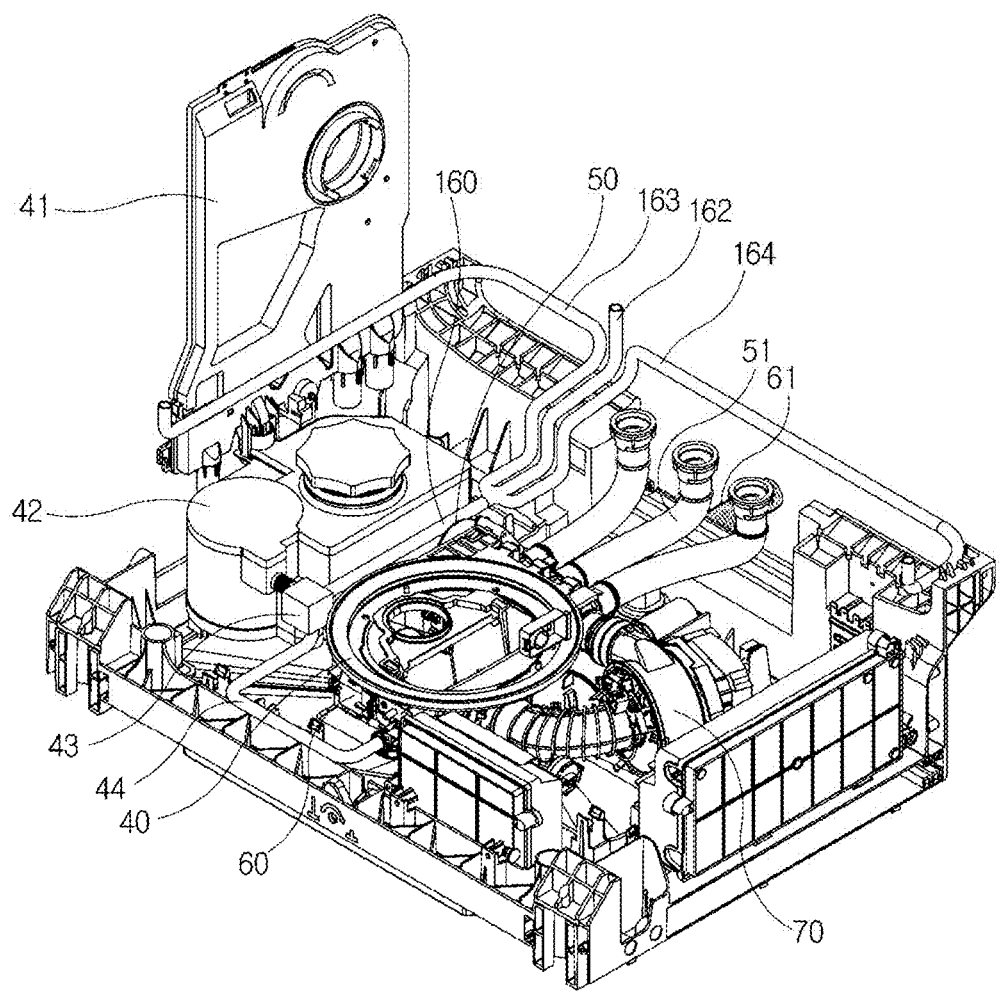

[Fig. 4a]
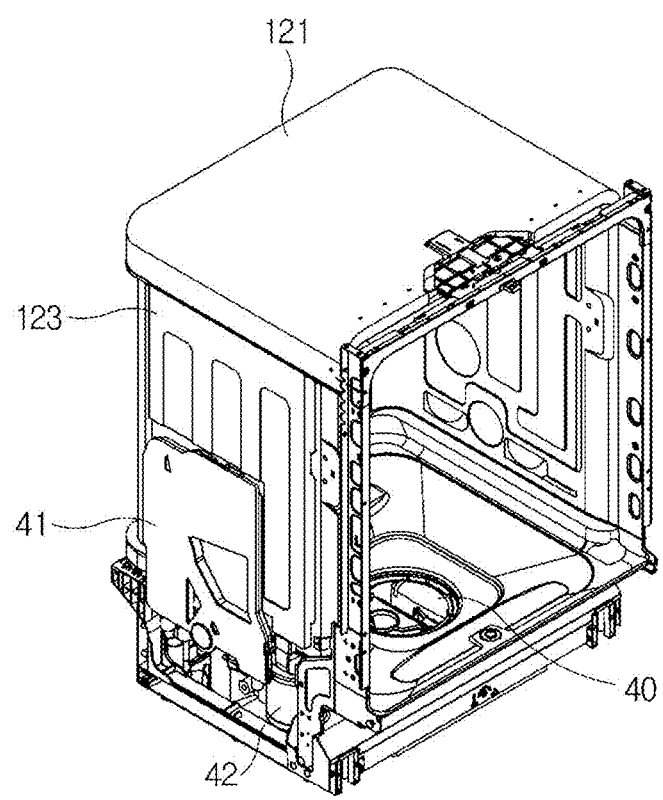

[Fig. 4b]
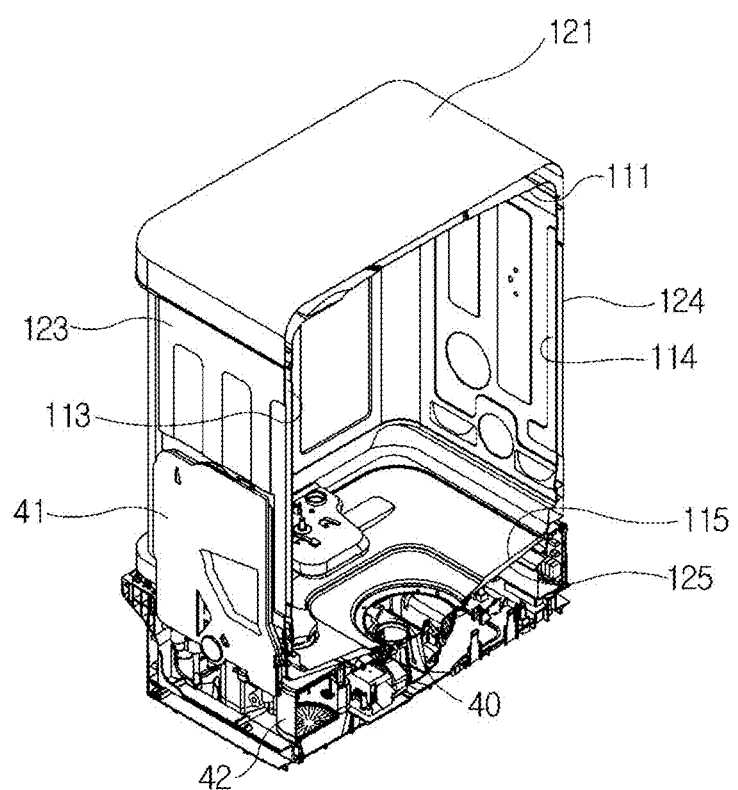

[Fig. 5]
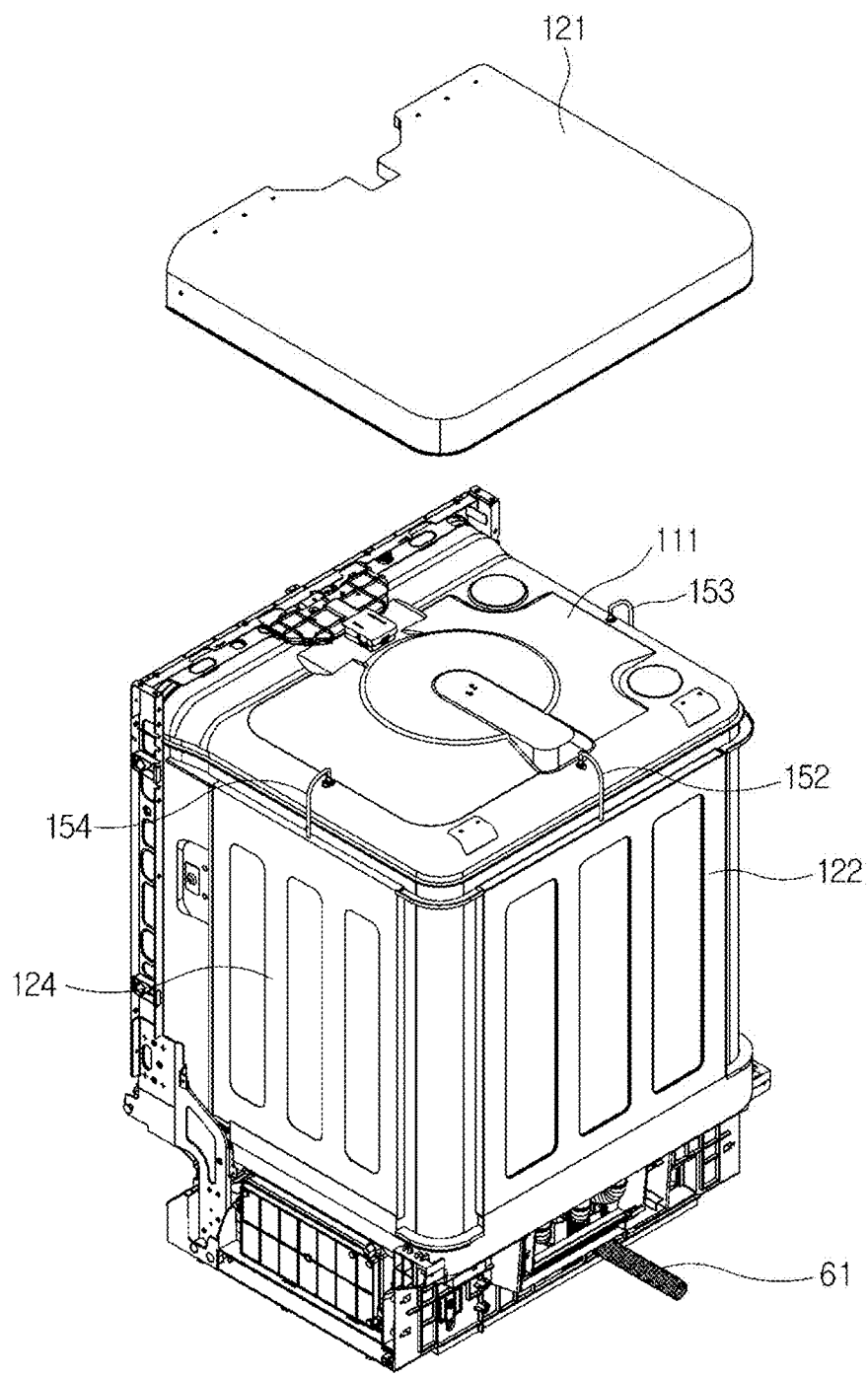

[Fig. 6]
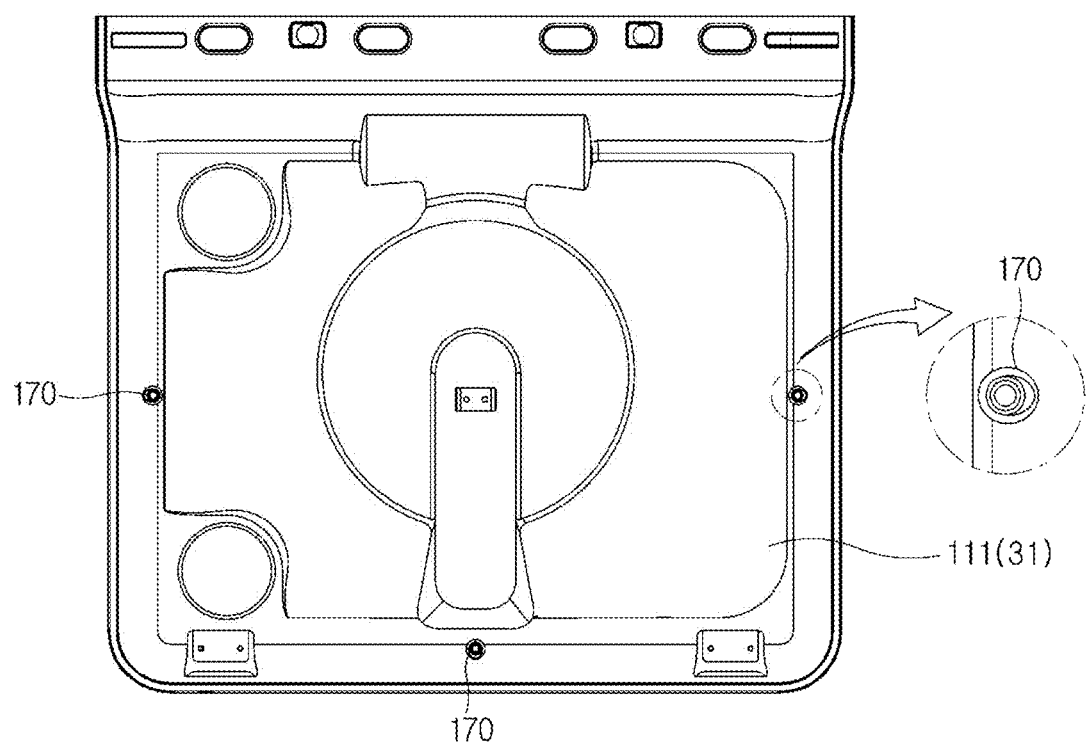

[Fig. 7a]
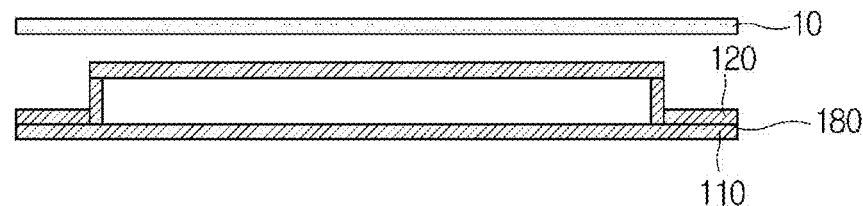

[Fig. 7b]
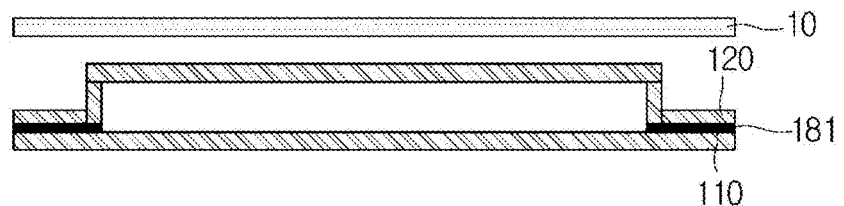

[Fig. 8a]
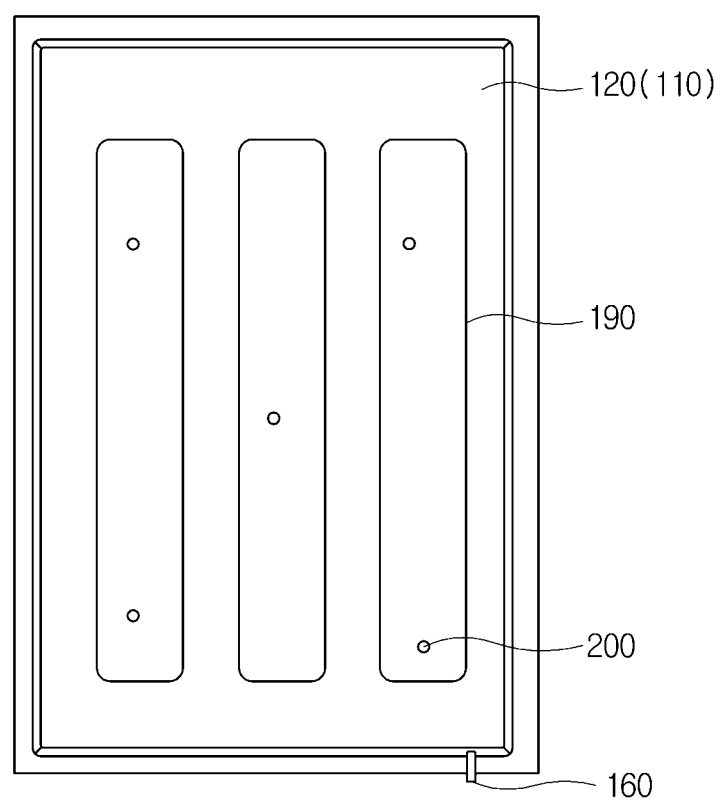

[Fig. 8b]
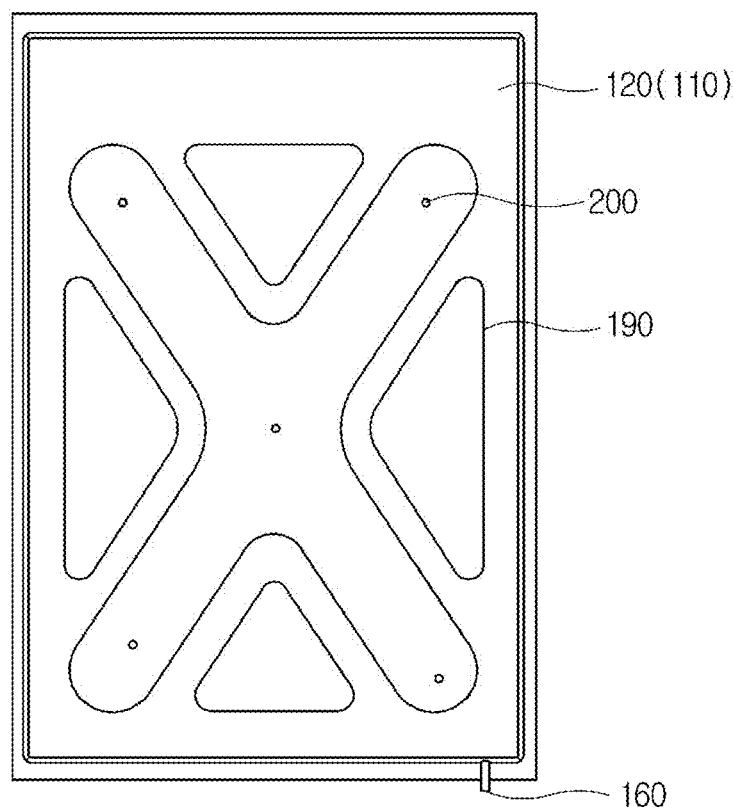

[Fig. 9]
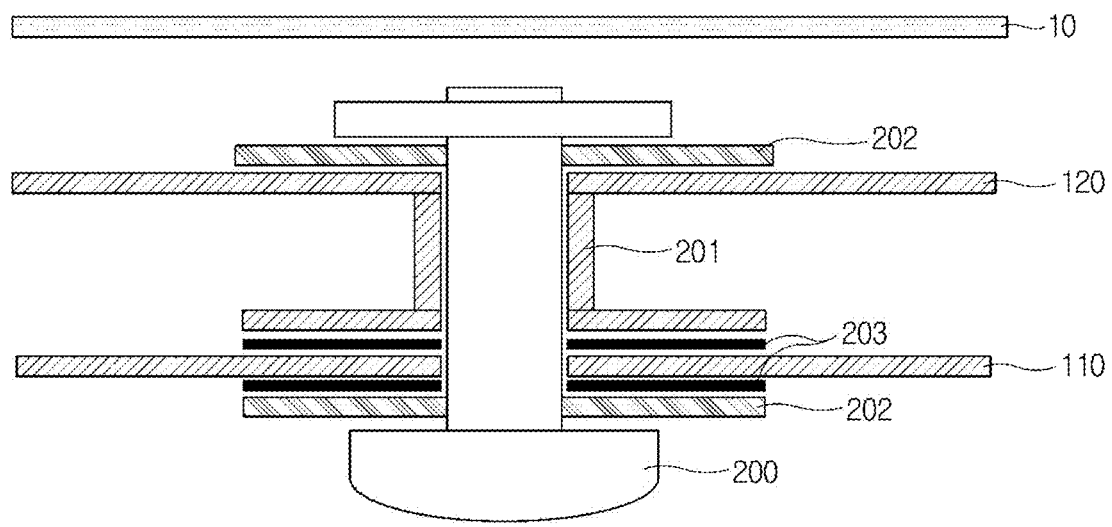

[Fig. 10a]
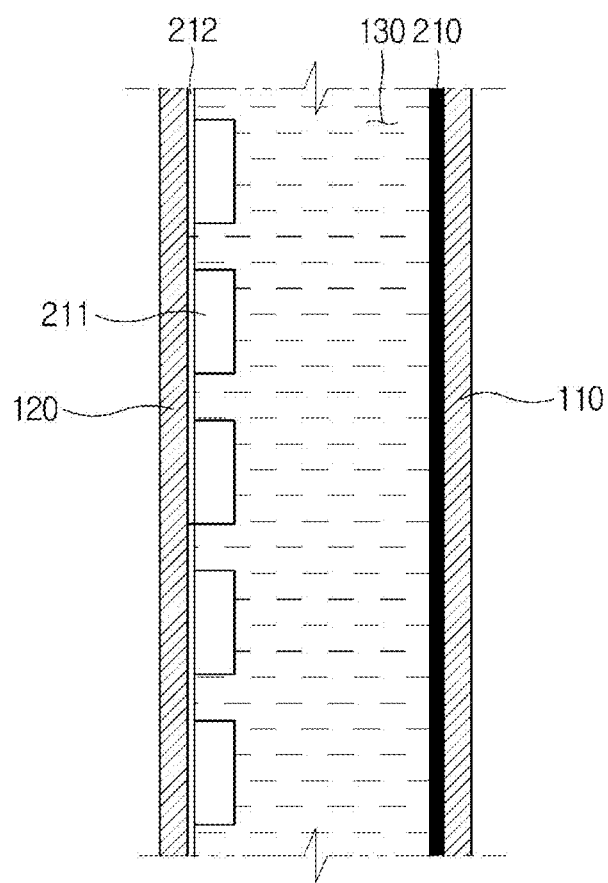

[Fig. 10b]
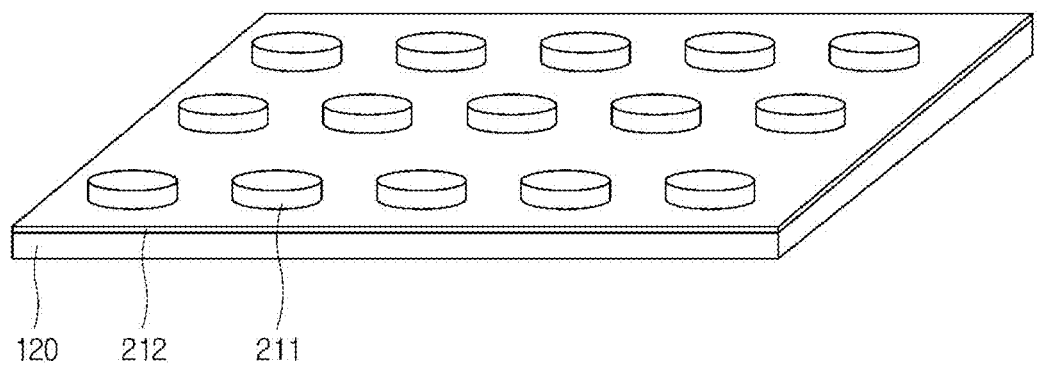

[Fig. 11]
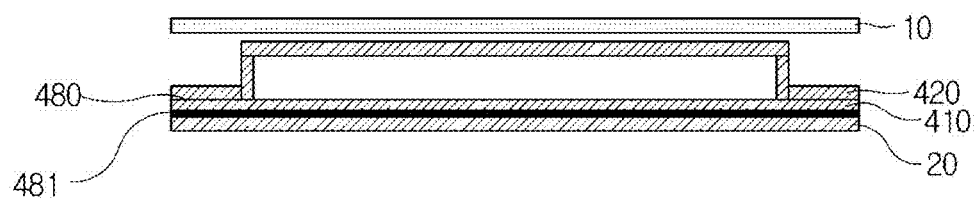

[Fig. 12]
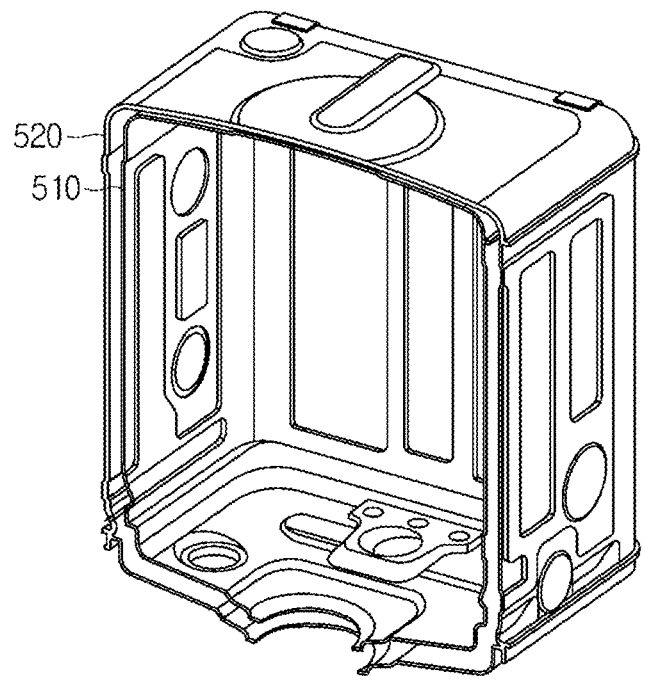

[Fig. 13]
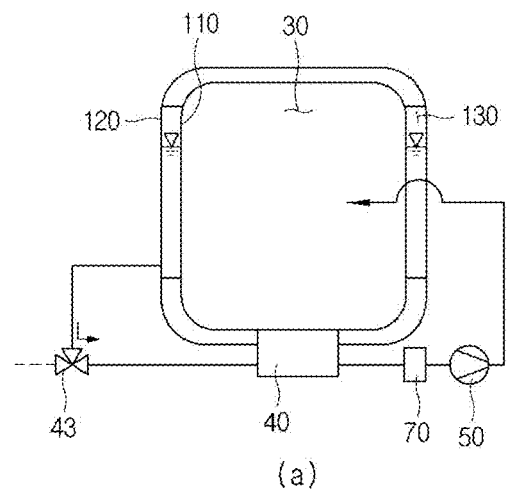
(a)
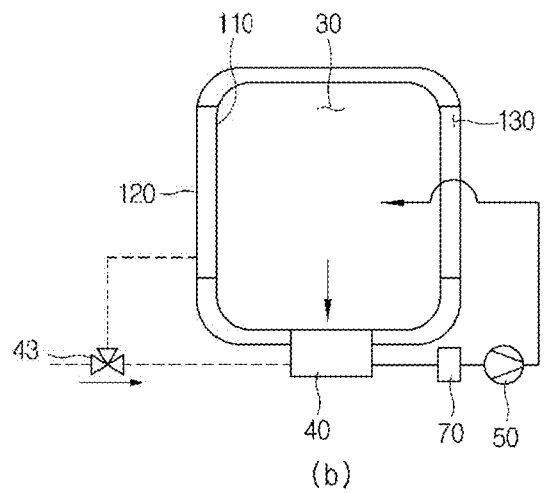
(b)
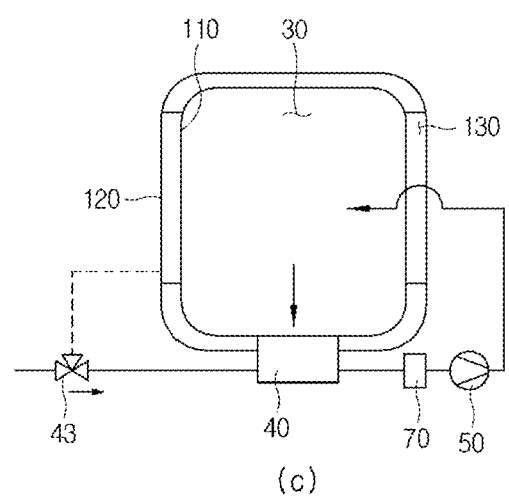
(c)
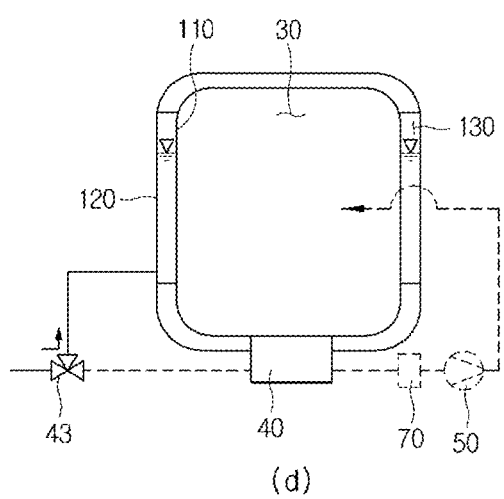
(d)

[Fig. 14]
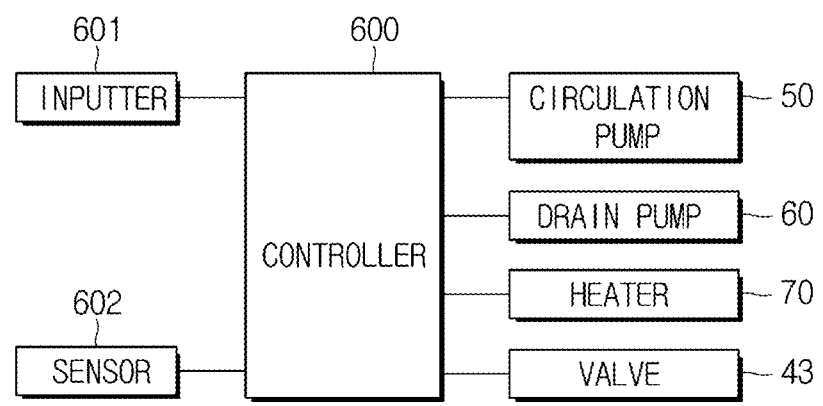

[Fig. 15]
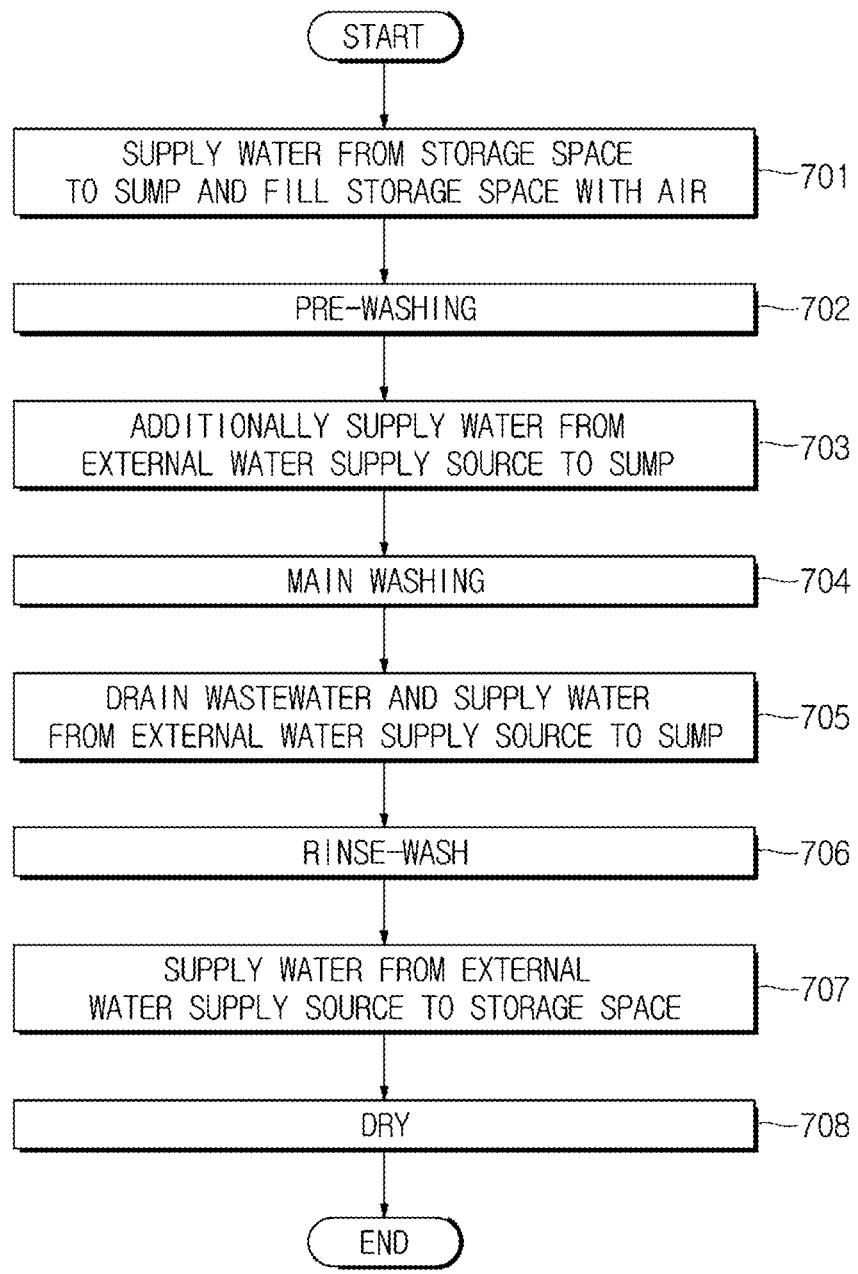

[Fig. 16]
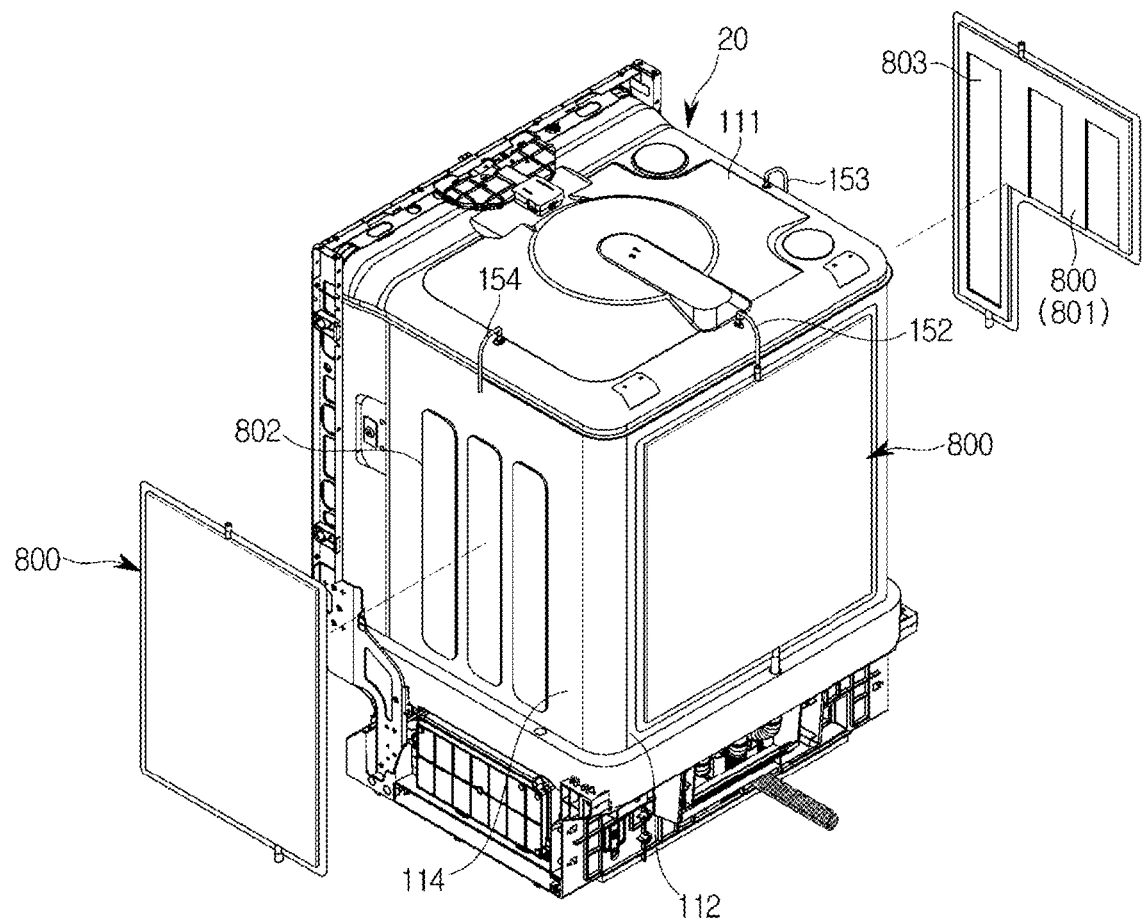

[Fig. 17]
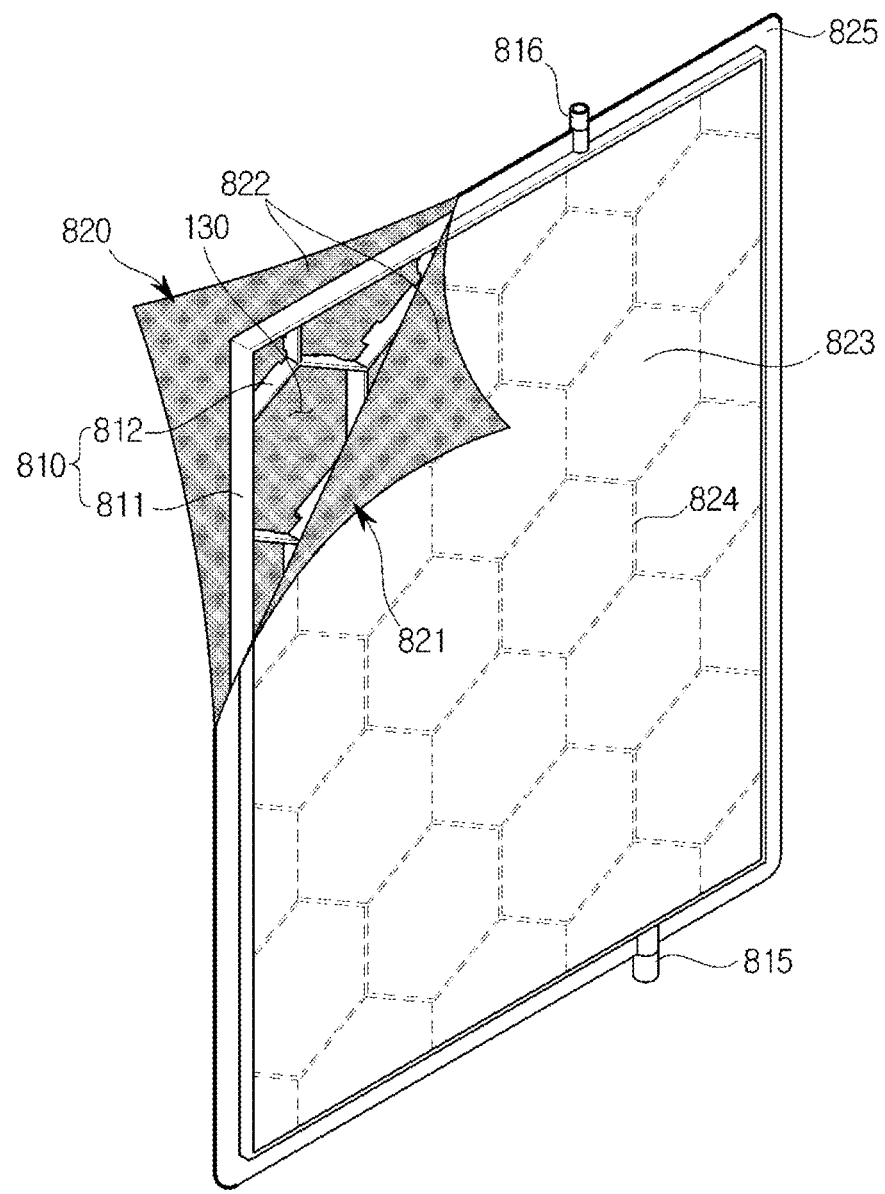

[Fig. 18]
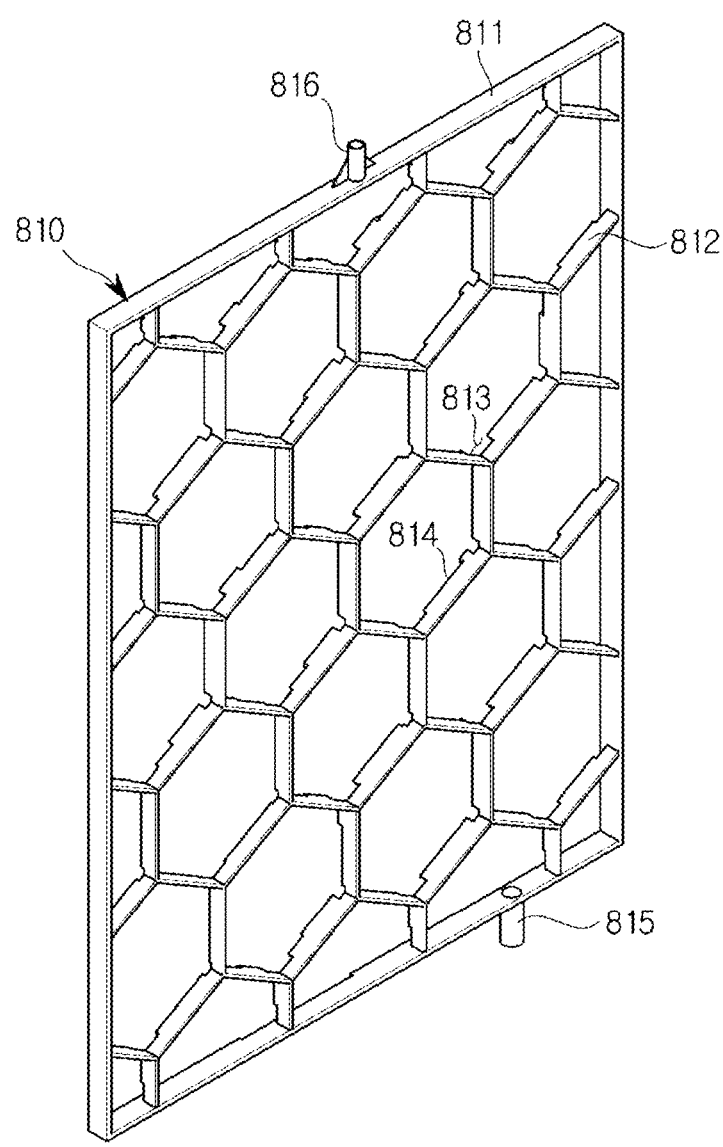

[Fig. 19]
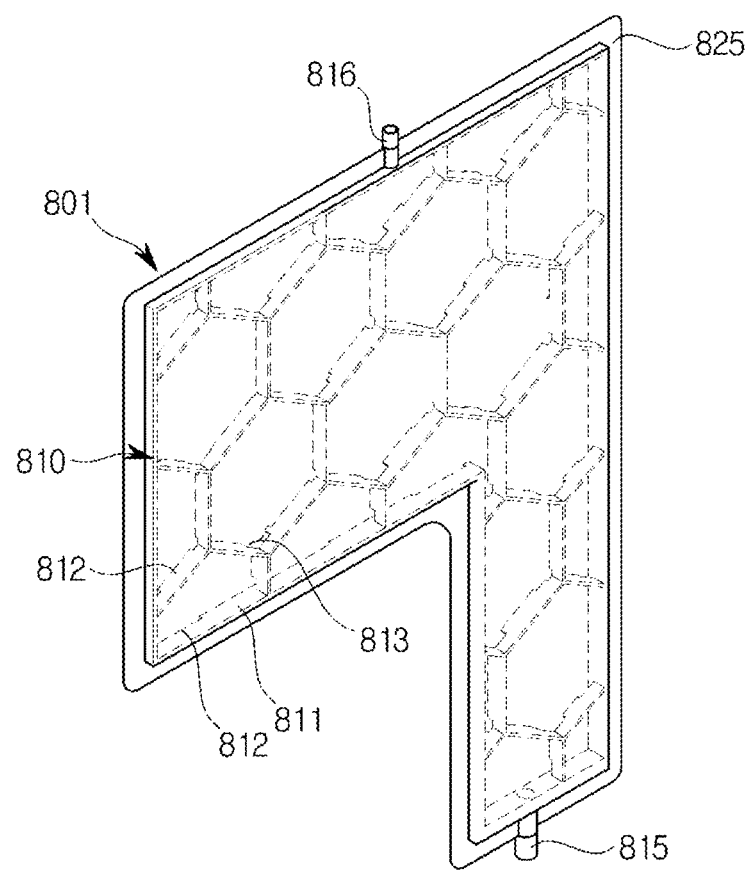

[Fig. 20]
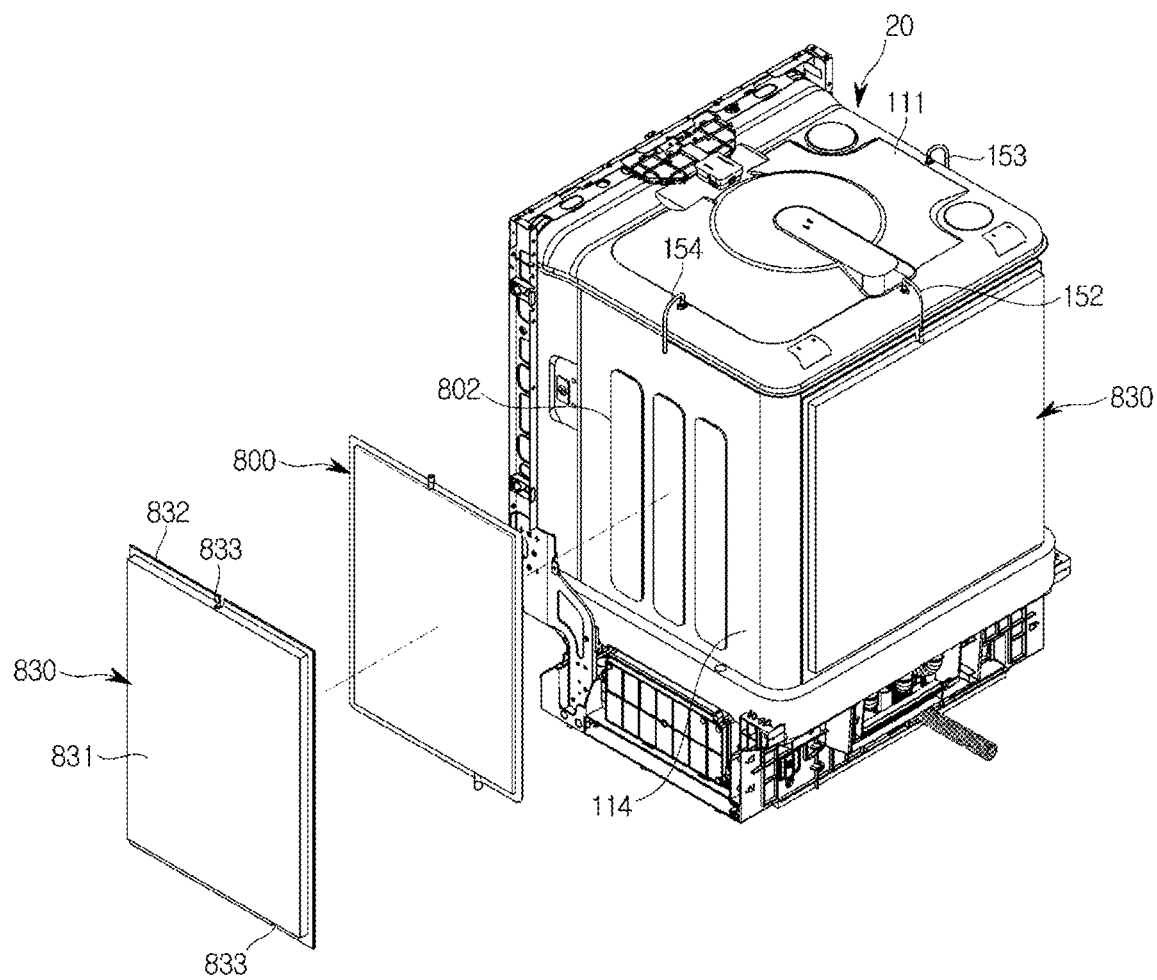

TUB FOR DISHWASHER, DISHWASHER, AND METHOD OF CONTROLLING SAME

CROSS-REFERENCE TO RELATED APPLICATIONS AND CLAIM OF PRIORITY

This application is a 371 National Stage of International Application No. PCT/KR2016/014050, filed Dec. 1, 2016, which claims priority to Korean Patent Application No. KR 10-2015-0171325, filed on Dec. 3, 2015 and Korean Patent Application No. 10-2016-0116263, filed Sep. 9, 2016 the disclosures of which are herein incorporated by reference in their entirety.

BACKGROUND

1. Field

The present disclosure relates to a dishwasher, and more specifically, to a dishwasher having a structure improved to increase energy efficiency and drying performance.

2. Description of Related Art

Generally, the number of electric appliances requiring a drying function, such as dishwashers, washing machines, and drying machines, has gradually increased. A dishwasher includes a drying function for removing wash water remaining on a surface of a washed dish, and a washing machine or drying machine includes a drying function for drying wet laundry.

For example, a washing machine, which is an electric appliance configured to hygienically and efficiently wash dishes, performs a function of washing dirty dishes and drying the dishes. A drying process of the washing machine is a process of removing water remaining on washed dishes. A drying process includes a process of facilitating evaporation of water remaining on dishes by increasing the temperature of water sprayed on the dishes at the time of final rinsing to increase the temperatures of the dishes, and a process of removing evaporated steam by condensing the evaporated steam on a dryer positioned inside or outside of a tub or on a wall of the tub.

When a dishwasher includes a drying unit, based on a type of dishwasher, air in a tub is circulated to the drying unit by operating a fan, and thus drying is performed by an absorbent. In this case, additional space and a component for the drying unit are required, and a restoring process for drying the absorbent is required so that a dehumidifying agent absorbs steam in the next drying process.

Therefore, additional energy for restoring the absorbent is consumed, and a washing space in which washing is performed on dishes is decreased as the size or amount of the absorbent is increased to secure drying performance.

Further, the dishwasher generally includes a vibration damping material attached to an outer surface of a tub to reduce vibration and noise generated during a washing process using high pressure, and an insulating material additionally attached to reduce thermal leakage.

The vibration damping material has a large thermal capacity for absorbing heat due to high density and high specific heat, which affects energy consumption. Therefore, the vibration damping material should have a minimum thickness and generally uses an asphalt vibration damping material having a thickness of 3 to 4 mm to have vibration and noise at a suitable level.

An appropriate heat insulation is required to reduce thermal loss to the outside, and a fabric felt-based heat insulating material is generally attached to an outer surface of a tub. However, it is hard to attach the heat insulating material to all surfaces of the tub due to space limitations, corner attachment problems, and interference with other structures. When the thermal performance of the heat insulating material or a thickness of the heat insulating material is increased, the thermal capacity is increased, and thus energy consumption is increased. Further, water remaining on dishes should be evaporated and condensed on a wall of the tub during a drying process, and in this case, cooling speed of the wall of the tub is decreased as thermal performance is increased, and thus reducing a condensing effect.

SUMMARY

The present disclosure is directed to providing a dishwasher which includes a tub of a double wall structure or a tub including a double wall panel, and has a structure that enables optional water inflow to a storage space in an inner space of the double wall structure or a storage space of a double wall panel based on each operation of a dishwashing cycle, to simultaneously perform heat insulation and cooling on a wall of a washing chamber.

The present disclosure is directed to providing a dishwasher having a structure in which water introduced into the inner space of the double wall structure and used to cool a wall of a washing chamber is used in the next washing process to reduce overall water consumption.

In accordance with one aspect of the present disclosure, a tub for a dishwasher includes a washing chamber having an open front surface and surrounded by a left wall, a right wall, an upper wall, a lower wall, and a rear wall thereof, and an outer wall separated from at least one of the walls of the washing chamber.

The tub for the dishwasher may further include a storage space configured to store water or air and formed between the at least one wall of the washing chamber and the outer wall.

An attached portion of the at least one wall of the washing chamber and the outer wall may be sealed.

The at least one wall of the washing chamber and the outer wall may be formed of at least one of a metal material and a resin material, and may be attached by at least one of welding, heat plate bonding, and bonding.

The tub for the dishwasher may further include a partition configured to divide the storage space so that the storage space is partially filled with water or air.

The tub for the dishwasher may further include a pattern formed at the outer wall or the at least one wall of the washing chamber so that a gap between the at least one wall of the washing chamber and the outer wall is constantly maintained.

The tub for the dishwasher may further include a spacer configured to connect the at least one wall of the washing chamber with the outer wall so that a gap between the at least one wall of the washing chamber and the outer wall is constantly maintained.

The tub for the dishwasher may further include a rib formed between the at least one wall of the washing chamber and the outer wall so that a gap between the at least one wall of the washing chamber and the outer wall is constantly maintained.

The tub for the dishwasher may further include an overflow pipe configured to collect overflowed water in the washing chamber when the water overflows from the storage space.

The overflow pipe may include a check valve to allow the water to be moved from the storage space to only the washing chamber.

The upper wall of the washing chamber connected with the overflow pipe may be provided with a filter to prevent foreign materials from being introduced into the overflow pipe.

The tub for the dishwasher may further include a blocking member provided between the at least one wall of the washing chamber and the outer wall and configured to reduce vibration and noise.

The blocking member may include a vibration preventing member with which the at least one wall of the washing chamber is coated.

The blocking member may include an air cap provided at the outer wall.

The blocking member may include a heat insulating member with which the outer wall is coated.

In accordance with another aspect of the present disclosure, a dishwasher includes a tub including a washing chamber having an open front surface and formed by at least one wall, an outer wall separated from the at least one wall of the washing chamber, and a storage space formed between the at least one wall of the washing chamber and the outer wall, a sump which is provided below the tub and in which washing water sprayed to the washing chamber is collected, a water supply pipe provided to supply water to the sump, a water supply and drain pipe configured to supply water to the storage space or drain the water from the storage space, a valve connected with an external water supply source, the water supply pipe, and the water supply and drain pipe, and a controller configured to control the valve.

The controller may control the valve to supply water supplied from the external water supply source to the storage space, drain the water stored in the storage space to the sump, supply the water supplied from the external supply source to the sump.

The dishwasher may further include a water level sensor configured to detect an amount of the water stored in the storage space, and the controller may control the valve according to a water level of the storage space detected by the water level sensor.

The controller may control the valve so that the water stored in the storage space is drained when the water is not used for a predetermined time.

The tub may further include a partition configured to partition the storage space so that the storage space is partially filled with water or air, and the controller may control the water or air to be selectively supplied to spaces divided by the partition.

In accordance with still another aspect of the present disclosure, a tub for a dishwasher includes a washing chamber having an open front surface and surrounded by at least one wall, and a double wall panel mounted at an outer side of the at least one wall of the washing chamber and including a storage space in which the water or air supplied from an external water supply source is stored.

The double wall panel may include an inner wall attached to the at least one wall of the washing chamber and an outer wall separated from the inner wall, a surface at which the inner wall is attached to the outer wall may be sealed, and the inner wall may be attached to the at least one wall of the washing chamber by a heat conductive bonding member.

In accordance with yet another aspect of the present disclosure, a dishwasher includes an inner tub configured to form a washing chamber and an outer tub separated a predetermined distance from the inner tub to surround the inner tub so that heat in the washing chamber may be blocked or absorbed and noise caused by vibration of the inner tub may be reduced.

In accordance with yet another aspect of the present disclosure, a method of controlling the dishwasher includes draining water stored in a storage space between a wall of a washing chamber and an outer wall of a tub to a sump provided below the tub when a dish-washing cycle is started, filling the storage space with air, performing pre-washing on dishes using the water moved to the sump, performing main washing by supplying water from an external water supply source to the sump, draining dirty water after the main washing and supplying water from the external water supply source to the sump to rinse the dishes, and drying the dishes by supplying water to the storage space.

The method may allow water to be supplied to the storage space or the water stored in the storage space to be drained by allowing a water level sensor to detect an amount of water stored in the storage space.

The method may allow the water stored in the storage space to be drained when the dish-washing cycle is finished and then the next dish-washing cycle is not started in a predetermined time.

The storage space may be divided by at least one partition, and water or air may be selectively supplied to the storage spaces divided by the partition.

In accordance with yet another aspect of the present disclosure, a tub for a dishwasher includes a washing chamber having an open front surface and surrounded by at least one wall, and a pouch mounted at an outer side of the at least one wall of the washing chamber and including a storage space in which water or air is stored.

The pouch may include a frame configured to constantly maintain an inner gap and divide the storage space.

The pouch may include a first film and a second film, and the first film and the second film may be attached to each other on an outer side of the frame.

Each of the first film and the second film may include an inner surface made of a resin material, and the first film and the second film may be attached through the heat plate bonding method.

The frame may include a resin material, and the first film and the second film may be attached to the frame through the heat plate bonding method.

The frame may include an inlet-outlet provided to allow water or air to be introduced in or discharged from the storage space of the pouch.

The frame may include an overflow outlet provided to allow water to be returned to the washing chamber when the water in the storage space of the pouch overflows.

The pouch may be attached to the at least one wall of the washing chamber by a heat conductive bonding member.

Each of the first film and the second film may include an outer surface made of a nylon or aluminum material.

The frame may include an outer wall forming a shape of the pouch and a partition wall disposed on an inner side of the outer wall to divide the storage space.

The partition wall may include an opening through which water or air flows to the divided storage space.

The storage space may include a first chamber in or from which water or air is introduced or discharged and a second chamber in which air is stored but water is not introduced.

The at least one wall of the washing chamber may include a protruding pattern formed on an outer surface thereof, and the frame may include an incised part provided at the partition wall or one side of the outer wall to correspond to the pattern so that the pouch is attached to the outer surface of the at least one wall on which the pattern is formed.

The tub for a dishwasher may further include a pouch cover disposed outside the pouch to cover the pouch and mounted on the at least one wall of the washing chamber.

The dishwasher can reduce thermal loss during heating and washing processes due to a heat insulation effect of an air layer existing in an inner space of a double wall structure of a tub, and thus reduces overall energy consumption.

Further, since a thermal load of a vibration damping material attached to an outer surface of a conventional tub does not exist, overall energy consumption can be reduced.

Further, since water stored in an inner space of a double wall structure is used in the next washing process, water consumption can be reduced, and since a temperature of the water stored in the inner space of the double wall structure is generally higher than that of water supplied from an external water supply source, energy used to increase a temperature of wash water can be saved.

Further, there are no vibration damping material and heat insulating material that are used in a conventional dishwasher, thereby securing more washing space in a tub and simplifying a vibration damping structure and a heat insulation structure.

BRIEF DESCRIPTION OF THE DRAWINGS

FIG. 1 is a schematic cross-sectional view showing a dishwasher according to one embodiment of the present disclosure.

FIG. 2 is a view showing a bottom of a washing chamber of the dishwasher in FIG. 1.

FIG. 3 is a perspective view showing a lower portion of a tub of the dishwasher in FIG. 1.

FIG. 4A is a perspective view showing the tub of the dishwasher in FIG. 1.

FIG. 4B is a cross-sectional perspective view of the tub of the dishwasher in FIG. 4A.

FIG. 5 is a rear perspective view showing an exploded upper outer wall of the tub in FIG. 4A.

FIG. 6 is a view showing an upper surface of the washing chamber of the dishwasher in FIG. 1.

FIGS. 7A and 7B are cross-sectional views showing a bonding state of the double wall structure of the dishwasher in FIG. 1.

FIGS. 8A and 8B are side views of a double wall panel or a double wall structure of the dishwasher according to one embodiment of the present disclosure.

FIG. 9 is a cross-sectional view of a spacer constantly maintaining a gap of a double wall structure of the dishwasher according to one embodiment of the present disclosure.

FIG. 10A is a cross-sectional view showing a blocking member disposed between double wall structures of the dishwasher according to one embodiment of the present disclosure.

FIG. 10B is a perspective view showing an outer wall in FIG. 10A.

FIG. 11 is a cross-sectional view showing a bonding state of a double wall panel of a dishwasher according to another embodiment of the present disclosure.

FIG. 12 is a perspective view showing a cross-section of a double tub of a dishwasher according to still another embodiment of the present disclosure.

FIG. 13 is a block diagram showing a dishwashing cycle of the dishwasher according to one embodiment of the present disclosure.

FIG. 14 is a control block diagram of the dishwasher according to one embodiment of the present disclosure.

FIG. 15 is a flowchart of the dishwasher according to one embodiment of the present disclosure.

FIG. 16 is an exploded perspective view showing an pouch separated from a dishwasher according to yet another embodiment of the present disclosure.

FIG. 17 is a perspective view showing the inside of the pouch shown in FIG. 16.

FIG. 18 is a perspective view of a frame shown in FIG. 17.

FIG. 19 is a perspective view showing a pouch of the dishwasher according to yet another embodiment of the present disclosure.

FIG. 20 is an exploded perspective view showing a pouch cover separated from the dishwasher according to yet another embodiment of the present disclosure.

DETAILED DESCRIPTION

Embodiments described in this specification and configurations illustrated in drawings are only exemplary examples of the present disclosure, and there may be various modifications that may substitute for the embodiments and the drawings in the specification at the time of this application's filing.

Further, the same reference number or symbols disclosed in each of the drawings of the specification denote identical components or configurations which perform substantially the same functions.

Terms used in the specification are only used to describe specific exemplary embodiments and do not limit the present disclosure. Singular forms used herein are intended to include plural forms unless explicitly indicated otherwise. It should be further understood that the terms "includes", "comprises", or "have" used in this specification specify the presence of stated features, numerals, steps, operations, components, parts, or a combination thereof, but do not preclude the presence or addition of one or more other features, numerals, steps, operations, components, parts, or a combination thereof.

Hereinafter, a dishwasher and a control method thereof according to embodiments of the present disclosure will be described in detail with reference to the accompanying drawings.

FIG. 1 is a schematic cross-sectional view showing a dishwasher according to one embodiment of the present disclosure, FIG. 2 is a view showing a bottom of a washing chamber of the dishwasher in FIG. 1, FIG. 3 is a perspective view showing a lower portion of a tub of the dishwasher in FIG. 1, FIG. 4A is a perspective view showing the tub of the dishwasher in FIG. 1, FIG. 4B is a cross-sectional perspective view of the tub of the dishwasher in FIG. 4A, FIG. 5 is a rear perspective view showing an exploded upper outer wall of the tub in FIG. 4A, and FIG. 6 is a view showing an upper surface of the washing chamber of the dishwasher in FIG. 1.

As shown in FIGS. 1 and 2, a dishwasher 1 may include a case 10 forming an exterior thereof and a tub 20 provided in the case 10 and forming a washing chamber 30. The washing chamber 30 may have baskets 12 and 13 for accommodating dishes, spray nozzles 310, 320, 330, and 340 through which wash water is sprayed, a vane 350 for guiding the wash water onto the dishes while moving on a bottom 35 of the washing chamber 30, and a vane driver 351 for driving the vane 350.

The tub 20 may have a substantially box shape with an opening formed at the front thereof for putting in or taking out the dishes. The front opening of the tub 20 may be opened or closed by a door 11. The washing chamber 30 formed in the tub 20 may have an upper surface 31, a rear surface 32, a left surface 33, a right surface 34, and a lower surface 35.

The baskets 12 and 13 may be a wire rack made of a wire so that the wash water passes through the baskets without remaining therein. The baskets 12 and 13 may be provided to be attached to or detached from the washing chamber 30. The baskets 12 and 13 may include an upper basket 12 disposed at an upper portion of the washing chamber 30 and a lower basket 13 disposed at a lower portion of the washing chamber 30.

The spray nozzles 310, 320, 330, and 340 may allow the dishes to be washed by spraying the wash water at high pressure. The spray nozzles 310, 320, 330, and 340 may include an upper rotating nozzle 310 provided at the upper portion of the washing chamber 30, a middle rotating nozzle 320 provided in the middle of the washing chamber 30, and the fixed nozzles 330 and 340 provided at the lower portion of the washing chamber 30.

The upper rotating nozzle 310 is provided above the upper basket 12 and may spray the wash water downward while being rotated by a water pressure. To this end, spray holes 311 may be provided at a lower end of the upper rotating nozzle 310. The upper rotating nozzle 310 may directly spray the wash water onto the dishes stored in the upper basket 12.

The middle rotating nozzle 320 is provided between the upper basket 12 and the lower basket 13, and may spray the wash water in a vertical direction while being rotated by a water pressure. To this end, spray holes 321 may be provided at an upper end and a lower end of the middle rotating nozzle 320. The middle rotating nozzle 320 may directly spray the wash water onto the dishes stored in the upper basket 12 and the lower basket 13.

The fixed nozzles 330 and 340 are provided not to be moved unlike the rotating nozzles 310 and 320 and are fixed to one side of the washing chamber 30. The fixed nozzles 330 and 340 are disposed adjacent to a rear surface 32 of the washing chamber 30 and may spray the wash water onto a front side of the washing chamber 30. Therefore, the wash water sprayed from the fixed nozzles 330 and 340 may not be directly sprayed onto the dishes.

The wash water sprayed from the fixed nozzles 330 and 340 may be guided onto the dishes by the vane 350. The fixed nozzles 330 and 340 are disposed under the lower basket 13, and the vane 350 may guide the wash water sprayed from the fixed nozzles 330 and 340 upward. That is, the wash water sprayed from the fixed nozzles 330 and 340 may be guided onto the dishes stored in the lower basket 13 by the vane 350.

The fixed nozzles 330 and 340 may each include a plurality of spray holes 331 and 341 arranged in a lateral direction of the washing chamber 30. The plurality of spray holes 331 and 341 allow the wash water to be sprayed in the front side.

The vane 350 may extend lengthily in a lateral direction of the washing chamber 30 so that all the wash water sprayed from the spray holes 331 and 341 of the fixed nozzles 330 and 340 is guided. That is, one end of the vane 350 in a longitudinal direction is provided adjacent to a left surface 33 of the washing chamber 30, and the other end of the vane 350 in the longitudinal direction is provided adjacent to a right surface 34 of the washing chamber 30.

The vane 350 may linearly reciprocate in a spraying direction of the wash water sprayed from the fixed nozzles 330 and 340. That is, the vane 350 may linearly reciprocate in a front-rear direction of the washing chamber 30.

Therefore, a linear spray structure including the fixed nozzles 330 and 340 and the vane 350 may allow an entire area of the washing chamber 30 to be washed thoroughly. The linear spray structure may defer from the rotating nozzles allowing the wash water to be sprayed only within a range of a rotation radius thereof.

The fixed nozzles 330 and 340 may include a left fixed nozzle 330 disposed on the left of the washing chamber 30 and a right fixed nozzle 340 disposed on the right of the washing chamber 30.

The rotating nozzles 310 and 320 and the fixed nozzles 330 and 340 may allow the wash water that is sprayed to be independent of each other. Further, the left fixed nozzle 330 and the right fixed nozzle 340 may also allow the wash water that is sprayed to be independent of each other.

The wash water sprayed from the left fixed nozzle 330 is guided to only a left area of the washing chamber 30 by the vane 350, and the wash water sprayed from the right fixed nozzle 340 may be guided to only a right area of the washing chamber 30 by the vane 350.

Therefore, the dishwasher 1 may independently and separately wash the left and right sides of the washing chamber 30. Unlike the embodiment, the washing chamber 30 may not only be divided into the left and right sides, but may also be more specifically divided as needed.

Referring to FIGS. 1 to 3, a sump 40 for storing the wash water, a circulation pump 50 for pressurizing the wash water of the sump 40 and supplying the wash water to the spray nozzles 310, 320, 330, and 340, and a drain pump 60 for discharging wastewater stored in the sump 40 to the outside of the case 10 may be disposed under the tub 20. The drain pump 60 may be connected with a drain pipe 61.

Further, the dishwasher 1 may include a case brake 41 including a water flow sensor (not shown) provided therein to control flow rate of water supplied from an external water supply source and a water softener 42 for removing calcium, iron and the like dissolved in tap water by receiving water from the case brake 41. The case brake 41 may be provided at a side surface of the tub 20 in a panel shape, and the water softener 42 may be provided under the tub 20.

The soft water having a low hardness, lowered by the water softener 42, is supplied to the sump 40 to be used as the wash water. The wash water stored in the sump 40 may be heated by a heater 70 to increase washing efficiency based on a dish-washing cycle and may be pressurized by the circulation pump 50, moved to the spray nozzles 310, 320, 330, and 340 through a nozzle water supply pipe 51, and sprayed into the washing chamber 30.

Referring to FIGS. 1 to 4B, the tub 20 of the dishwasher according to one embodiment of the present disclosure may include a double wall structure including an inner wall 110 at a side of a washing chamber 30 and an outer wall 120 at a side of the case.

The double wall structure may be provided on at least one of the upper surface 31, the rear surface 32, the left surface 33, the right surface 34, and the lower surface 35. That is, the tub 20 may include inner walls 110 forming the washing chamber 30, and the inner walls 110 may include an upper wall 111, a rear wall 112, a left wall 113, a right wall 114, and a lower wall 115. The outer wall 120 may be formed to be separated from at least one of the inner walls 110. Further, a storage space 130 for storing water or air may be formed in an inner space between the inner wall 110 and the outer wall 120.

The water moved into the case 10 of the dishwasher 1 through the case brake 41 and the water softener 42 from the external water supply source may be supplied to the storage space 130 or the sump 40. Further, the water stored in the storage space 130 may be supplied to the sump 40.

Specifically, a valve 43 may be provided at an outlet side of the water softener 42, and a water supply and drain pipe 160 connected to the storage space 130 and a water supply pipe 44 connected to the sump 40 may be connected to the valve 43. Further, the dishwasher 1 may include a controller 600 configured to control the valve 43.

The controller 600 may control the valve 43 to supply water supplied from the external water supply source to the storage space 130 through the water supply and drain pipe 160 or to drain water stored in the storage space 130 from the storage space 130 to the sump 40, and may control the valve 43 to supply the water supplied from the external water supply source to the sump 40 through the water supply pipe 44.

Further, although not shown in the drawings, a water level sensor may be provided in the storage space 130 to detect the amount of stored water and may control the valve 43 according to a water level of the storage space 130 detected by the water level sensor.

Further, the controller 600 may control the valve 43 by detecting the amount of wash water in the washing chamber 30 by the water flow sensor (not shown) provided in the case brake 41.

Further, when the storage space 130 is not used for a predetermined time, the controller 600 may control the valve 43 to drain the water stored in the storage space 130 to prevent germs from growing in the stored water or the storage space 130.

The double wall structure of the tub 20 may include a partition 140 dividing the storage space 130 so that the storage space 130 may be partially filled with water or air. The inner wall 110 may be divided into the upper wall 111, the rear wall 112, the left wall 113, the right wall 114, and the lower wall 115 by the partition 140 connecting the inner wall 110 and the outer wall 120, and the outer wall 120 may be divided into an upper outer wall 121, a rear outer wall 122, a left outer wall 123, a right outer wall 124, and a lower outer wall 125 by the partition 140. Further, the partition 140 may be provided to more specifically divide the storage space 130 formed by the sides of the inner wall 110 and the outer wall 120 and may have a coupling structure precisely sealed so that water or air does not leak from the divided storage space 130.

The dishwasher 1 according to one embodiment of the present disclosure may be provided to store water or air in the divided rear storage space, left storage space, and right storage space and may be provided to store air in an upper storage space and a lower storage space.

Referring to FIG. 3, the water supply and drain pipe 160 of the storage space 130 may be branched into a rear water supply and drain pipe 162, a left water supply and drain pipe 163, and a right water supply and drain pipe 164 connected to the divided rear storage space, left storage space, and right storage space. Although not shown in the drawing, a valve is provided at a branched point of the water supply and drain pipe 160 to enable optional water supply to each divided storage space of the storage space 130 by the controller 600.

Further, referring to FIGS. 1 and 5, the dishwasher 1 may include an overflow pipe 150 provided so that overflowing water is collected in the washing chamber when the water overflows from the storage space 130. According to one embodiment of the present disclosure, when the storage space 130 is divided, a rear overflow pipe 152, a left overflow pipe 153, and a right overflow pipe 154 may be provided at upper portions of the rear storage space, the left storage space, and the right storage space, respectively.

Referring to FIG. 6, according to one embodiment of the present disclosure, a filter 170 may be provided at an upper surface 31 of the washing chamber 30 connected with one end of the overflow pipe 150 to prevent foreign materials from being introduced into the storage space 130.

Further, although not shown in the drawing, a check valve allowing only water to move from the storage space 130 to the washing chamber 30 may be provided at the overflow pipe 150.

In the inner wall 110 and the outer wall 120 of the tub 20 forming the storage space 130, an attached portion between the inner wall 110 and the outer wall 120 may be water-tightly sealed so that the water or air stored in the storage space 130 does not leak. Further, as described above, when the partition 140 connecting the inner wall 110 with the outer wall 120 and dividing the storage space 130 is provided, the attached portion may be water-tightly sealed.

FIGS. 7A and 7B are cross-sectional views showing a bonding state of the double wall structure of the dishwasher in FIG. 1.

The inner wall 110 and the outer wall 120 of the double wall structure may be formed of the same or different materials. Specifically, the inner wall 110 and the outer wall 120 may be formed of a metal material, such as stainless steel and the like, or a resin material such as plastic and the like.

Referring to FIG. 7A, the inner wall 110 and the outer wall 120 may be water-tightly attached to each other without using a separate adhesive. When the inner wall 110 and the outer wall 120 are made of a metal material, the inner wall 110 and the outer wall may be attached to each other at a bonding surface 180 by welding. When the inner wall 110 and the outer wall 120 are made of a resin material, the inner wall 110 and the outer wall may be attached to each other at the bonding surface 180 by heat plate bonding. Further, when the inner wall 110 is made of a metal material and the outer wall 120 is made of a resin material, a fine groove is formed in the bonding surface 180 of the inner wall 110 by laser, and the inner wall 110 and the outer wall 120 may be attached to each other at the bonding surface 180 of the outer wall 120 by laser welding performing heat plate bonding.

Referring to FIG. 7B, the inner wall 110 and the outer wall 120 may be water-tightly attached to each other by an adhesive. When the inner wall 110 and the outer wall 120 are made of a resin material, the inner wall 110 and the outer wall may be attached to each other by applying an adhesive to an attached layer 181. When the inner wall 110 is formed of a metal material and an outer wall 120 is formed of a resin material, the inner wall 110 and the outer wall 120 may be attached to each other by applying a primer-less adhesive to the attached layer 181.

The water may be stored in a storage space 130 formed in a double wall structure according to one embodiment of the present disclosure, and thus a bulge may be caused in the double wall structure by a load of water. Therefore, the dishwasher 1 may include a bulge preventing structure to prevent the bulge.

FIGS. 8A and 8B are side views of a double wall panel or a double wall structure of the dishwasher according to one embodiment of the present disclosure, and FIG. 9 is a cross-sectional view of a spacer constantly maintaining a gap of a double wall structure of the dishwasher according to one embodiment of the present disclosure.

The inner wall 110 or the outer wall 120 of the double wall structure may include a pattern 190 increasing strength to constantly maintain the gap between the inner wall 110 and the outer wall 120. The pattern 190 may be formed by a pressing process or die casting.

Referring to FIGS. 8A and 8B, the pattern 190 formed on the inner wall 110 or the outer wall 120 may be formed in various shapes as necessary. Further, a spacer 200 constantly maintaining the gap between the inner wall 110 and the outer wall 120 may be disposed. The spacer 200 may be disposed at a predetermined position as necessary.

Referring to FIG. 9, the inner wall 110 or the outer wall 120 may be punched so that the spacer 200 is disposed thereon. One end of the rib 201 may be air-tightly attached around a hole into which the spacer 200 formed on the outer wall 120 is inserted, and the other end of the rib 201 may include a contact surface to be in contact with the inner wall 110. A sealing layer 203 may be formed between the contact surface and the inner wall 110 to maintain airtightness, and a sealing layer 203 may be formed between a head of the spacer 200 and the inner wall 110 to maintain airtightness. Further, a washer 202 may be inserted into a gap between a head of one end of the spacer 200 and the inner wall 110 or a gap between a head of the other end of the spacer 200 and the outer wall 120.

Although not shown in the drawing, the rib 201 may be provided at a circumferential surface of the hole in which the spacer 200 is disposed or may be provided in an arbitrary space between the inner wall 110 and the outer wall 120 in a circular shape or another arbitrary shape to constantly maintain the gap between the inner wall 110 and the outer wall 120.

Generally, the dish washing cycle of the dishwasher includes washing, rinsing, and drying processes, and water may be supplied to correspond to each of the processes. The washing process is divided into a pre-washing process and a main washing process. In the pre-washing process, a predetermined amount of water is supplied to the sump 40 to remove foreign materials from dishes, and the wash water pressurized by the circulation pump 50 is sprayed on the washing chamber 30 through the spray nozzles 310, 320, 330, and 340 at high pressure and performs pre-washing while being circulated.

In the early stage of the washing process, a temperature of the wash water supplied from the sump 40 is increased by about 50° C. by the heater 70 to increase washing efficiency. The heated wash water increases the temperatures of the dishes, the baskets, the tub, and the structures, and a large amount of energy is consumed in this process. In the main washing process, the wash water sufficiently approaches the dishes by an increase in rotation speed of the circulation pump 50 and a stirring mechanism of the vane 350 and the spray nozzles 310, 320, 330, and 340, and thus efficient washing is performed.

The water contaminated during the rinsing process after the main washing process is drained by the drain pump 60, and water is additionally supplied to the sump 40. The rinse-washing process proceeds to a hot rinsing process for increasing a temperature of the dishes to enter final rinsing and drying processes after a cold rinsing process for washing away foreign materials detached from the dishes. In the hot rinsing process, the heater 70 is operated to increase a temperature of dishes by about 60° C.

When the temperature of the dishes is increased through the hot rinsing process, the wash water is drained and all operations are stopped at the same time in the drying process. Heat is transmitted from the wall of the washing chamber 30 to the outside, and drying is performed while the water on the wall is condensed.

The double wall structure of the dishwasher 1 according to one embodiment of the present disclosure may reduce vibration and noise caused by the dishwashing cycle. Further, the double wall structure can prevent thermal loss on the wall of the tub when a space between the double walls is filled with air, and can increase efficiency of a drying process by quickly absorbing heat from the wall of the tub when the water is supplied to the space between the double walls.

The double wall structure according to one embodiment of the present disclosure may include various blocking members between the inner wall 110 and the outer wall 120 to increase vibration preventing, noise preventing, and thermal insulating performances.

FIG. 10A is a cross-sectional view showing a blocking member disposed between double wall structures of the dishwasher according to one embodiment of the present disclosure, and FIG. 10B is a perspective view showing an outer wall in FIG. 10A.

Referring to FIGS. 10A and 10B, the inner wall 110 of the storage space 130 is coated with a vibration-absorbing member 210 for reducing vibration and noise. Further, the outer wall 120 of the storage space 130 is coated with an insulating member 212 to reduce transmission of radiant heat from the tub 20, and an air cap 211 may be provided to increase heat insulation performance.

The tub of the dishwasher according to one embodiment of the present disclosure may be formed in a double wall structure, and a double wall panel with a storage space may be attached to a tub of a dishwasher according to another embodiment of the present disclosure. Further, a tub of a dishwasher according to still another embodiment may be doubly formed.

FIG. 11 is a cross-sectional view showing a bonding state of a double wall panel of a dishwasher according to another embodiment of the present disclosure, and FIG. 12 is a perspective view showing a cross-section of a double tub of a dishwasher according to still another embodiment of the present disclosure.

A double wall panel including a storage space provided on at least one of a left surface, a right surface, a rear surface, an upper surface, and a lower surface of the washing chamber to store air or water supplied from an external water supply source may be provided in a tub 20 of the dishwasher according to another embodiment of the present disclosure.

Referring to FIG. 11, the double wall panel may include an inner wall 410 attached to a wall of the tub 20 and an outer wall 420 provided to be separated a predetermined space from the inner wall 410 toward the case 10. Further, the bonding surface 480 between the inner wall 410 and the outer wall 420 may be water-tightly formed by welding, heat plate bonding, and laser welding, and the inner wall 410 may be attached to the wall of the tub 20 by a heat conductive bonding member 481 such as a thermal paste or a heat conductive tape.

Further, referring to FIG. 12, the dishwasher according to still another embodiment of the present disclosure may include an inner tub 510 forming the washing chamber and an outer tub 520 surrounding the inner tub 510 and separated a predetermined distance from the inner tub 510. The outer tub 520 may block or absorb heat in the washing chamber and may reduce noise caused by vibration of the inner tub 510.

Hereinafter, a dishwashing cycle of the dishwasher according to one embodiment of the present disclosure and a control method thereof will be described.

FIG. 13 is a block diagram showing a dishwashing cycle of the dishwasher according to one embodiment of the present disclosure, FIG. 14 is a control block diagram of the dishwasher according to one embodiment of the present disclosure, and FIG. 15 is a flowchart of the dishwasher according to one embodiment of the present disclosure.

Referring to FIG. 13, FIG. 13A shows a flow of wash water in the pre-washing process of the dishwashing cycle, FIG. 13B shows a flow of wash water in the main washing process of the dishwashing cycle, FIG. 13C shows a flow of wash water in a rinse-washing process of the dishwashing cycle, and FIG. 13D shows a flow of wash water in the drying process of the dishwashing cycle.

Referring to FIG. 14, the dishwasher according to one embodiment of the present disclosure may include an inputter 601 for transmitting a start signal of the dishwashing cycle to the controller 600 by receiving an input of a user. The controller 600 may control the valve 43, the circulation pump 50, the drain pump 60, the heater 70, and the like according to each of the processes of the dishwashing cycle by receiving a signal of the inputter 601 and a signal of the sensor 602 including a water flow sensor of the case brake, a water level sensor of the storage space 130, and the like.

Referring to FIGS. 13 and 15, the controller 600 supplies water stored in the storage space 130 to the sump 40 and allows the storage space 130 to be filled with air by controlling the valve 43 when the pre-washing process of the dishwashing cycle starts (701). The water supplied to the sump 40 is circulated by the circulation pump 50 to perform pre-washing on the dishes in the washing chamber 30 (702). In this case, the controller 600 increases the temperature of wash water by operating the heater 70. The temperature of water stored in the storage space 130 is generally higher than that of water supplied from the external water supply source, and thus water consumption can be reduced and energy efficiency can be increased when the water stored in the storage space 130 is used.

When the main washing process starts after the pre-washing process is completed, the controller 600 additionally supplies required water to the sump 40 from the external water supply source by controlling the valve 43 (703). The controller 600 may control the amount of water supplied from the external water supply source by the water flow sensor provided in the case brake. The controller 600 performs main washing on the dishes in the washing chamber 30 by circulating the wash water in the sump 40 by the circulation pump 50 (704). In this case, the wash water is heated by the heater 70, and a detergent may be mixed in the wash water.

Before the rinsing process starts after the main washing process is completed, the controller 600 drains wastewater generated in the washing operation by operating the drain pump 60, and supplies water required for the rinsing process from the external water supply source to the sump 40 by controlling the valve 43 (705). When the rinse-washing operation starts with a cold-rinsing process, the controller 600 stops the operation of the heater 70 and circulates the wash water by the circulation pump 50, and performs rinsing and washing (706). After the cold-rinsing process is completed, the controller 600 heats the wash water by operating the heater 70, and finally performs a hot-rinsing process of rinsing and washing the dishes (706). The wash water heated in the hot-rinsing process increases the temperature of the dishes.

When the pre-washing process starts, the storage space 130 is maintained in a state in which the storage space 130 is filled with air until the hot-rinsing process is finished after the water is drained from the storage space 130, and thus the energy consumption can be reduced by the heater 70 due to a heat insulation effect caused by an air layer in the storage space 130. Further, the air layer in the storage space 130 can reduce vibration and noise generated in the dish-washing cycle.

When the rinse-washing is finished, the controller 600 drains the wash water by operating the drain pump 60 and supplies water to the storage space 130 from the external water supply source (707). The introduced cold water cools a wall of the washing chamber 30, and the water evaporated from the dishes heated in the hot-rinsing process is condensed on the wall of the washing chamber 30, and thus the dishes in the washing chamber 30 are dried (708).

The water supplied to the storage space 130 may be used in the pre-washing operation when the next dishwashing cycle starts. The controller 600 drains the water stored in the storage space 130 when the dishwashing cycle does not start for a predetermined time or more after the dishwashing cycle is finished, and may perform pre-washing by supplying water from the external water supply source by a water level sensor provided in the storage space when the next dishwashing cycle starts.

Further, the controller 600 may supply a predetermined amount of water to the storage space 130 by a water level sensor provided in the storage space 130. Further, for efficient use of the storage space 130, the storage space 130 may be divided by at least one partition, and the controller 600 may selectively supply water or air to the spaces divided by the partition.

Further, although not shown in the drawing, a water supply pipe and a drain pipe may be separately provided in the storage space 130, and the efficiency of cooling the wall of the washing chamber 30 can be increased during the drying process of the dishwashing cycle when the water supply pipe is provided above the storage space 130.

According to yet another embodiment of the present disclosure, a pouch with a storage space may be attached to a tub of a dishwasher.

FIG. 16 is an exploded perspective view showing an pouch separated from a dishwasher according to yet another embodiment of the present disclosure, FIG. 17 is a perspective view showing the inside of the pouch shown in FIG. 16, and FIG. 18 is a perspective view of a frame shown in FIG. 17.

Referring to FIGS. 16 to 18, a pouch 800 with a storage space 130 provided at least one outer side of an upper surface, a rear surface, a left surface, a right surface, and a lower surface of a washing chamber to store water or air supplied from an external water supply source may be attached to a tub 20 of a dishwasher according to yet another embodiment of the present disclosure.

The tub 20 may include an upper wall 111, a rear wall 112, a left wall, a right wall 114, and a lower wall forming the washing chamber, and the pouch 800 may be attached to an outer side of at least one wall of the washing chamber.

The storage space 130 for storing water or air is provided in the pouch 800. The pouch 800 may constantly maintain an inner space and may include a frame 810 dividing the storage space 130.

The pouch 800 may include a first film 820 and a second film 821 and may be formed by attaching edges 825 of the first film 820 and the second film 821. The first film 820 and the second film 821 are water-tightly attached to outer sides of the frame 810, and may be provided to prevent water or air from leaking from the storage space 130. Inner surfaces 822 of the first film 820 and the second film 821 may include a resin material, and the first film 820 and the second film 821 may be water-tightly attached through a heat plate bonding method.

The first film 820 and the second film 821 are attached to outer sides of the frame 810, and may also be attached to the frame 810 at a portion in contact with the frame 810. The frame 810 may include a resin material and may be attached to the inner surfaces 822 of the first film 820 and the second film 821 including a resin material through a heat plate bonding method.

In the pouch 800, at least one of a surface formed of the first film 820 and a surface formed of the second film may be attached to an outer side of at least one wall of the washing chamber. The pouch 800 may be attached to at least one wall of the washing chamber by a heat conductive bonding member such as a thermal paste, a conductive tape, or the like.

The outer surface 823 of the first film 820 or the second film 821 of the pouch 800 may include a nylon material or an aluminum material. When an outer surface 823 of the first film 820 or the second film 821 includes an aluminum material, the outer surface 823 may efficiently transmit and receive heat to and from at least one wall of the washing chamber.

The frame 810 may include an outer wall 811 and a partition wall 812 provided on an inner side of the outer wall 811. A shape of the pouch 800 may be determined based on a shape of the outer wall 811 of the frame 810.

FIG. 19 is a perspective view showing a pouch of the dishwasher according to yet another embodiment of the present disclosure.

Referring to FIGS. 16 and 19, other components of the dishwasher, such as a case brake and the like, may be disposed at one surface of the tub 20. Therefore, the pouch 800 may include the frame 810 having various shapes of outer wall 811 as necessary, and may also have various shapes based on the shape of the outer wall 811.

The partition wall 812 may divide the storage space 130 on an inner side of the outer wall 811 so that the storage space 130 in the pouch 800 is partially filled with air or water. The inner surfaces 822 of the first film 820 and the second film 821 of the pouch 800 may be attached to the partition wall 812 through a heat plate bonding method, and a bonding line 824 in FIG. 17 shows a state in which the first film 820 or the second film 821 of the pouch 800 is attached to the partition wall 812 based on a shape of the partition wall 812. The partition wall 812 may be provided to divide an inner space of the outer wall 811 in a hive shape, and the storage space 130 in the pouch 800 may be divided into hive-shaped hexagonal chambers. Further, a bulge generated by the attachment of the first film 820 or the second film 821 with the partition wall 812 can be prevented.

The partition wall 812 may include an opening 813 through which water or air is moved into the divided storage spaces 130. The opening 813 may be provided in the middle of the partition wall 812 and may be provided in a shape in which one side of the partition wall 812 is incised.

The storage space 130 may include a first chamber into or from which water or air is introduced or discharged and a second chamber in which air is stored and water is not introduced. That is, a part of the chambers formed by the partition wall 812 does not have the opening 813 formed in the partition wall 812 so that water is not introduced thereinto.

An outer surface of at least one of the washing chamber may include a protruding pattern 802 provided to increase strength. Generally, the outer wall 811 and the partition wall 812 may have the same height to constantly maintain an inner space of the pouch 800. That is, the outer wall 811 and the partition wall 812 may generally have the same height so that the pouch 800 has a constant thickness.

However, the frame 810 may include an incised part 814 provided at one side of the outer wall 811 or the partition wall 812 so that the pouch 800 is attached to an outer surface of at least one wall of the washing chamber with the pattern 802. A recess 803 corresponding to the pattern 802 of the wall of the washing chamber may be formed in one surface of the pouch 800 by the incised part 814 formed in the frame 810.

The frame 810 may include an inlet-outlet 815 provided so that water or air is introduced into or discharged from the storage space 130 of the pouch 800. Specifically, the inlet-outlet 815 may be provided at the outer wall 811 of the frame 810. Further, the pouch 800 may be attached to an outer side of at least one wall of the washing chamber so that the inlet-outlet 815 is positioned at a lower portion of the pouch 800, and the water supply and drain pipe may be connected to the inlet-outlet 815 of the pouch 800.

The frame 810 may include an overflow outlet 816 provided so that the water overflowing to the washing chamber is collected when the water overflows from the storage space 130 of the pouch 800. Particularly, the overflow outlet 816 may be provided at the outer wall 811 of the frame 810. Further, the pouch 800 may be attached to an outer side of at least one wall of the washing chamber so that the overflow outlet 816 is positioned at an upper side of the pouch 800, and the overflow pipes 152, 153 and 154 may be connected to the overflow outlet 816 of the pouch 800.

The dishwasher according to yet another embodiment of the present disclosure further includes a pouch cover preventing the pouch from being damaged.

FIG. 20 is an exploded perspective view showing an pouch cover separated from the dishwasher according to yet another embodiment of the present disclosure.

The pouch cover 830 may be disposed at an outer side of the pouch 800 to surround the pouch 800, and may be mounted to at least one wall of the washing chamber. The pouch cover 830 may include a pouch accommodating part 831 provided to accommodate the pouch 800 and a mount part 832 provided to be mounted to at least one wall of the washing chamber.

Further, the pouch cover 830 may include a groove 833 provided so that the inlet-outlet 815 or the overflow outlet 816 of the pouch 800 is exposed to the outside of the pouch cover 830. The groove 833 may be provided in a shape in which the mount part 832 and the pouch accommodating part 831 are partially incised. The groove 833 is provided even on the mount part 832, and thus the pouch 800 is attached to the outer side of at least one wall of the washing chamber, and then the pouch cover 830 may be easily mounted to the outer side of at least one wall of the washing chamber to surround the pouch 800.

The pouch cover 830 may be made of various materials, such as a metal material and a resin material, and may be mounted to at least one wall of the washing chamber in various methods including welding, bonding, heat plate bonding, and the like.

The scope of the present disclosure is not limited to the above-described specific embodiments. Various other embodiments that may be changed or modified by those skilled in the art without departing from the scope and spirit of the present disclosure defined by the appended claims fall within the scope of the present disclosure.

The invention claimed is:

1. A tub for a dishwasher, comprising:
a washing chamber having an open front surface and surrounded by a left wall, a right wall, an upper wall, a lower wall, and a rear wall thereof;
an outer wall separated from at least one of the walls of the washing chamber;
a storage space formed between each of the rear wall, the right wall, and the left wall of the washing chamber and the outer wall; and
a partition connecting each of the rear wall, the right wall, and the left wall of the washing chamber to the outer wall to divide the storage space.

2. The tub for the dishwasher of claim 1, wherein the storage space is configured to store water or air.

3. The tub for the dishwasher of claim 1, wherein an attached portion of the at least one wall of the washing chamber and the outer wall is sealed.

4. The tub for the dishwasher of claim 3, wherein the at least one wall of the washing chamber and the outer wall are formed of at least one of a metal material and a resin material, and are attached by at least one of welding, heat plate bonding, and bonding.

5. The tub for the dishwasher of claim 2, wherein the storage space is partially filled with water or air.

6. The tub for the dishwasher of claim 1, further comprising a pattern formed at the outer wall or the at least one wall of the washing chamber so that a gap between the at least one wall of the washing chamber and the outer wall is constantly maintained.

7. The tub for the dishwasher of claim 1, further comprising a spacer configured to connect the at least one wall of the washing chamber with the outer wall so that a gap between the at least one wall of the washing chamber and the outer wall is constantly maintained.

8. The tub for the dishwasher of claim 1, further comprising a rib formed between the at least one wall of the washing chamber and the outer wall so that a gap between the at least one wall of the washing chamber and the outer wall is constantly maintained.

9. The tub for the dishwasher of claim 2, further comprising an overflow pipe configured to collect overflowed water in the washing chamber when the water overflows from the storage space.

10. The tub for the dishwasher of claim 9, wherein the overflow pipe includes a check valve to allow the water to be moved from the storage space to only the washing chamber.

11. The tub for the dishwasher of claim 9, wherein the upper wall of the washing chamber connected with the overflow pipe is provided with a filter to prevent foreign materials from being introduced into the overflow pipe.

12. The tub for the dishwasher of claim 1, further comprising a blocking member provided between the at least one wall of the washing chamber and the outer wall and configured to reduce vibration and noise.

13. The tub for the dishwasher of claim 12, wherein the blocking member includes a vibration preventing member with which the at least one wall of the washing chamber is coated.

14. The tub for the dishwasher of claim 12, wherein the blocking member includes an air cap provided at the outer wall.

15. The tub for the dishwasher of claim 12, wherein the blocking member includes a heat insulating member with which the outer wall is coated.

* * * * *